US010269265B2

(12) United States Patent
Orr

(10) Patent No.: US 10,269,265 B2
(45) Date of Patent: Apr. 23, 2019

(54) SYSTEM AND METHOD FOR SIMULATING INTRAUTERINE CONTRACTIONS FOR NONINVASIVE INTRA-PARTUM FETAL MONITORING

(71) Applicant: Dynasthetics, LLC, Salt Lake City, UT (US)

(72) Inventor: Joseph Orr, Salt Lake City, UT (US)

(73) Assignee: Dynasthetics, LLC, Salt Lake City, UT (US)

( * ) Notice: Subject to any disclaimer, the term of this patent is extended or adjusted under 35 U.S.C. 154(b) by 127 days.

(21) Appl. No.: 15/257,444

(22) Filed: Sep. 6, 2016

(65) Prior Publication Data

US 2018/0068589 A1 Mar. 8, 2018

(51) Int. Cl.
G09B 23/28 (2006.01)

(52) U.S. Cl.
CPC .................. G09B 23/281 (2013.01)

(58) Field of Classification Search
CPC .... G09B 23/32; G09B 23/281; G09B 23/303; G09B 23/30
USPC ........................................................ 434/273
See application file for complete search history.

(56) References Cited

U.S. PATENT DOCUMENTS

| 3,599,628 | A | * | 8/1971 | Abbenante | A61B 5/02411 600/511 |
| 3,797,130 | A | * | 3/1974 | Knapp | G09B 23/281 434/273 |
| 3,822,486 | A | * | 7/1974 | Knapp | G09B 23/281 434/273 |
| 3,906,937 | A | | 9/1975 | Aronson | |
| 4,133,616 | A | | 1/1979 | Poirier et al. | |
| 4,240,409 | A | | 12/1980 | Robinson et al. | |
| 4,989,615 | A | * | 2/1991 | Hochberg | A61B 5/4356 600/587 |
| 5,184,619 | A | * | 2/1993 | Austin | A61B 5/035 600/376 |
| 5,224,490 | A | * | 7/1993 | Allen | A61B 5/6831 600/588 |
| 5,289,827 | A | * | 3/1994 | Orkin | A61B 5/033 600/588 |
| 5,377,673 | A | * | 1/1995 | Van Dell | A61B 5/035 600/310 |
| 5,871,499 | A | * | 2/1999 | Hahn | A61B 17/42 600/588 |

(Continued)

*Primary Examiner* — David L Lewis
*Assistant Examiner* — Shauna-Kay Hall
(74) *Attorney, Agent, or Firm* — Durham Jones & Pinegar; Sarah W. Matthews; Christopher Wight

(57) ABSTRACT

A method and apparatus to simulate intrauterine contractions to train clinicians in using a tocodynamometer (TOCO) transducer. The apparatus includes an enclosure housing an air bladder, with an opening in the enclosure for a TOCO transducer to be placed in contact with the air bladder. The air bladder is selectively pressurized by a source of compressed gas, the flow being controlled by a flow valve. A pressure release valve is provided to reduce pressure in the bladder. A pressure sensor monitors the bladder pressure, and can be used to calibrate the system to determine what bladder pressure produced a given uterine activity. The flow valve may be controlled by a software run on a processor to achieve particular uterine activity levels over a given period of time.

17 Claims, 4 Drawing Sheets

(56) References Cited

U.S. PATENT DOCUMENTS

| | | | |
|---|---|---|---|
| 5,879,293 A * | 3/1999 | Hojaiban | A61B 5/0261 600/310 |
| 6,231,524 B1 * | 5/2001 | Wallace | A61B 5/035 600/585 |
| 6,440,089 B1 * | 8/2002 | Shine | A61B 5/033 600/591 |
| 6,503,087 B1 * | 1/2003 | Eggert | G09B 23/28 434/262 |
| 6,751,498 B1 * | 6/2004 | Greenberg | A61B 5/02405 600/511 |
| 7,226,420 B2 | 6/2007 | Machit et al. | |
| 2002/0173735 A1 | 11/2002 | Lewis | |
| 2003/0153832 A1 * | 8/2003 | Zumeris | A61B 5/033 600/437 |
| 2005/0131307 A1 | 6/2005 | Ruiter et al. | |
| 2007/0088239 A1 | 4/2007 | Roth et al. | |
| 2008/0138780 A1 | 6/2008 | Eggert et al. | |
| 2009/0005690 A1 * | 1/2009 | Irland | A61B 8/4227 600/472 |
| 2009/0011394 A1 | 1/2009 | Meglan et al. | |
| 2009/0148822 A1 | 6/2009 | Eggert et al. | |
| 2012/0232398 A1 * | 9/2012 | Roham | A61B 8/0866 600/453 |
| 2013/0289456 A1 | 10/2013 | Chang Guo et al. | |
| 2014/0316314 A1 | 10/2014 | Schubert | |
| 2016/0361224 A1 | 12/2016 | Ramakrishna et al. | |

* cited by examiner

SYSTEM AND METHOD FOR SIMULATING INTRAUTERINE CONTRACTIONS FOR NONINVASIVE INTRA-PARTUM FETAL MONITORING

FIELD OF INVENTION

This invention relates generally to fetal monitoring simulation systems and methods. It is particularly directed to a system and method for simulating uterine contractions to train clinicians in the use of tocodynamometers.

BACKGROUND

Noninvasive intra-partum, or electronic fetal monitoring (EFM), is a generally accepted standard of care in obstetrics. EFM provides a visual continuous beat-to-beat recording of the fetal heart rate and a recording of uterine activity. EFM shows how the fetus responds before, during, and after each contraction and provides a graphic record for review. The goal of electronic fetal monitoring is to assist in identifying possible problems of the fetus in order to reduce or relieve that distress. The device used for EFM is a cardiotocograph, and it usually consists of two sensors placed on the mother's abdomen and held in place with a strap or belt. One sensor, the tocodynamometer (TOCO) sensor, is a pressure-sensitive contraction transducer, and measures the intensity and duration of uterine contractions during labor. The other sensor measures fetal heart rate using doppler ultrasound to detect motion of the fetal heart valves. An example of a monitor that utilizes these sensors is the Avalon fm20 manufactured by Philips (Philips Medical, Andover Mass.).

Uterine activity is measured noninvasively using a tocodynamometer (TOCO) sensor placed on the abdomen of the mother, usually fixated to the skin by a band around the belly. The TOCO sensor includes a probe that extends from the base of the sensor into the mother's abdomen. The probe is connected to a force or pressure sensor that measures how much force the tissue beneath the probe exerts on the probe. As the uterus contracts during labor, the tissue beneath the probe hardens and more force is exerted on the probe. The measured force is scaled to indicate uterine activity (UA) by the electronic fetal monitor. The monitor includes capability to adjust for differences in the baseline UA signal to compensate for band tightness and for softness of the tissue below the UA sensor. The UA signal is plotted over time and clinicians are trained to interpret the relative intensity of uterine contractions relative to prior contractions and to disregard the absolute UA value. The UA signal may be interpreted to assess several factors, such as the frequency of contractions, the duration of contractions, the intensity of the contractions (determined by the pressure sensor), and the resting tone of the uterus between contractions.

Clinicians commonly train for obstetrical procedures, such as EFM, using simulation. EFM is a key part of clinicians' training. In most training systems, the electronic fetal monitoring is simulated using a computer screen that is programmed to look like an EFM plot, rather than using an actual EFM monitor. Thus, clinicians are not able to practice using the EFM sensors that they will use on patients. Clinicians are not able to practice placement of the sensors, or any use of the actual device.

Consequently, there is a long felt need for a technology that could more accurately simulate the clinical experience of using EFM. For example, of the EFM signals could be physically simulated so that simulated uterine activity and fetal heart rate data could be presented on actual EFM devices, the realism of the simulation-based training would be improved and the clinicians in training would be able to learn to better interact with actual clinical monitors and devices during simulated crisis situations.

SUMMARY

This present disclosure relates to methods and systems for identifying the source of oxygen delivery failure to a patient. In one aspect, the method may comprise:

This invention is a novel apparatus that simulates the physical properties that are measured by an EFM device. Using this invention, the realism and utility of simulation based training for obstetrical procedures can be improved by using actual patient monitors.

Described herein is a device for simulating intrauterine contractions, the device comprising: an enclosure having an opening therethrough configured to receive a force sensor of a tocodynamometer; a bladder configured to fit within the enclosure; the bladder in fluid communication with a pressure release valve and a flow valve. In some configurations, the fluid communication may comprise a length of tubing, the length of tubing connected to the bladder and to a source of compressed gas.

According to another aspect, the length of tubing may be in fluid communication with the bladder, and the length of tubing may be connected to a pressure sensor. In some configurations, the flow valve is a variable flow valve.

According to yet another aspect, the device may further comprise a processor, and wherein the processor is in communication with the flow valve and the pressure sensor. The processor may have software programmed to open and close the flow valve to achieve one or more pre-programmed pressures at the pressure sensor. The pre-programmed pressures may be programmed to mimic one or more uterine activity levels of a pregnant patient.

In some configurations, the flow valve is a digital flow valve, and a processor may be in communication with the digital flow valve and the pressure sensor. The processor may have software thereon programmed to open and close the digital flow valve to achieve one or more pre-programmed pressures at the pressure sensor.

The device may further comprise a length of tubing in fluid communication with the bladder, pressure release valve, and flow valve, the enclosure having a hole, the length of tubing passing through the hole, and the flow valve external to the enclosure.

According to another aspect, a tocodynamometer with a pressure-sensing portion may be provided, the pressure-sensing portion placed over the opening of the enclosure and in contact with the bladder.

In some configurations, a device for training clinicians in the use of tocodynamometers may comprise a frame, the frame having an opening on a top surface, a bladder housed in the frame, the bladder in fluid communication with a pressure release valve, a pressure sensor, and a flow valve. The flow valve may be one of a variable flow solenoid valve, a digital flow valve, and a fill and dump valve.

The device may include a processor in communication with the flow valve and the pressure sensor, and software on the processor programmed to open and close the flow valve to achieve one or more pre-programmed pressures at the pressure sensor. The pre-programmed pressures may be designed to mimic one or more uterine activity levels of a pregnant patient experiencing labor or false labor.

The device may further comprise a length of tubing having a first end and a second end, the bladder connected to the first end of a length of tubing, and the first end of the length of tubing passing through the frame; and wherein the second end of the length of tubing has a connector that is configured to connect to a source of compressed gas.

According to another aspect, a method is disclosed for training clinicians in the use of tocodynamometers, the method comprising: selecting a device designed to mimic uterine contractions, the device comprising: an enclosure, the enclosure having an opening on a top surface and a second opening on a lateral side; a bladder housed in the enclosure, the bladder connected to a first end of a length of tubing, the first end of the length of tubing passing through the second opening on the lateral side of the enclosure; the length of tubing having a pressure release valve proximal to the first end, a pressure sensor, and a flow valve; connecting the second end of the length of tubing to a source of compressed air or gas; connecting a tocodynamometer to the enclosure with a strap, the tocodynamometer having a pressure-sensing probe, and placing the pressure-sensing probe through the opening on the top surface of the enclosure and in contact with the bladder. The device may further comprise a processor in connection with the pressure sensor and flow valve, and wherein the method further comprises calibrating the device by adjusting the flow valve to achieve a pre-determined uterine activity level, and recording the pre-determined activity level and a pressure on the pressure sensor at the pre-determined uterine activity level.

According to yet another aspect, a kit containing a device for simulating intrauterine contractions is described, the kit comprising: an enclosure having an opening therethrough configured to receive a pressure sensor of a tocodynamometer; a bladder configured to be housed in the enclosure; a length of tubing, the length of tubing having a pressure release valve and a flow valve, and a connector configured to connect the length of tubing to a source of compressed gas.

A device for simulating intrauterine contractions is described herein, the device comprising: an enclosure having an opening therethrough configured to receive a force sensor of a tocodynamometer; a bladder configured to fit within the enclosure; the bladder in fluid communication with a pressure release valve; and wherein the bladder is configured to be connected to a constant source of pressure. In some configurations, the pressure release valve is configured to release pressure at pre-determined pressure thresholds.

BRIEF DESCRIPTION OF THE DRAWINGS

The following drawings illustrate what are currently considered to be specific configurations for carrying out the invention.

DETAILED DESCRIPTION

Figure 1:
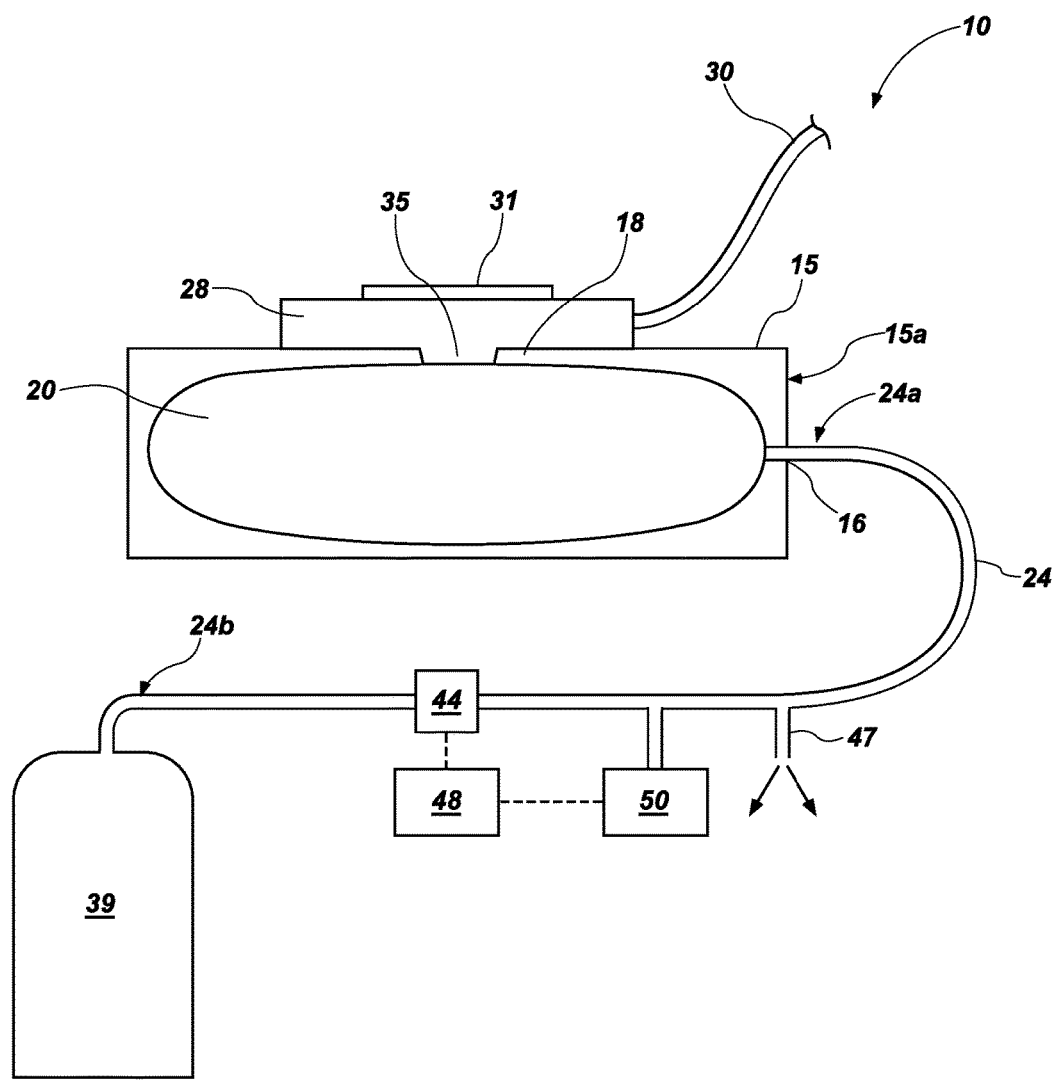
FIG. 1 is a side, cut-away view of a device that can be used to train clinicians in monitoring labor contractions.

Reference will now be made to the drawings in which the various elements of the illustrated configurations will be given numerical designations and in which the invention will be discussed so as to enable one skilled in the art to make and use the invention. It is to be understood that the following description is only exemplary of the principles of the present invention, and should not be viewed as narrowing the claims which follow.

Definitions

The term "TOCO transducer" means a standard tocodynamometer (TOCO) sensor or transducer. The TOCO transducer includes a probe that extends from the base of the transducer, and the probe is connected to a force or pressure sensor that may measure how much force the tissue beneath the probe exerts on the probe. Any suitable TOCO sensor known in the art may be used, such as: a Philips M1355A Toco Transducer, a Philips 15248A Toco Transducer, a Corometrics 2264HAX Toco Transducer, a Corometrics 2264LAX Toco Transducer, etc.

The term "valve" means any type of device for controlling the passage of gas through the tubing. For example, a solenoid valve may be used, a digital valve, fill and dump valves, a variable flow valve, a piezoelectric valve, a motor-driven valve, an electronically controlled proportional valve, etc.

The term "pressure release valve" means a hole in the length of tubing through which gas may intentionally pass. Alternatively, "pressure release valve" may mean a valve that selectively opens to allow air or gas to exit the length of tubing.

The term "bladder pressure" means the pressure that is measured by the pressure sensor downstream from the flow valve, the pressure sensor being in connection with the bladder. This pressure is typically primarily caused by gas or air forced into the bladder. Bladder pressure can also be affected by the ambient pressure. Bladder pressure is used to simulate intrauterine pressure caused by contractions.

The term "tubing" means a tube or other mechanism for fluidly connecting pneumatic components. For example, tubing as used herein comprises tubing such as plastic tubing, a pipe, a manifold, a sealed box with ports to connect various pneumatic components, etc.

The term "enclosure" means a housing, frame, casing, shell, container, or other structure capable of holding the bladder described herein in place. The enclosure may be substantially closed (such as with solid sidewalls) or may be substantially open, such as a frame. The enclosure may also have one or more openings to receive a TOCO sensor and/or tubing to fluidly connect the bladder to other pneumatic elements.

The term "logic" means an algorithm or a step-by-step method of solving a problem or making decisions. For clarity, the logic herein has been generally shown and described in a step-by-step manner with a particular order. However, the particular order shown is illustrative and not limiting. Some of the steps of the logic shown may be performed in the particular order shown, or some of the steps may be performed in a different order, or some of the steps may be performed at the same time.

The term "processor" means a standard processor, typically equipped with a control unit, a logic unit, and a register.

A side, cut-away of the apparatus for simulating intrauterine contractions, generally indicated at 10, is shown in FIG. 1, with the pneumatics shown in schematic form. In clinical practice, the apparatus may be used as-is, or may be mounted on the abdominal wall of a maternal manikin. The apparatus generally consists of an enclosure 15 with an opening 18 on the top surface. A bladder 20 may be housed in the enclosure 15. A length of tubing 24 may be connected to the bladder 20 to deliver pressurized gas or air to the bladder 20. A TOCO transducer 28 may be used in conjunction with the device, and may be mounted to the enclosure 15 via a retaining strap 31 or other retaining device (such as a clamp, etc.). If the apparatus is connected to a maternal manikin, the strap 31 may extend around the abdomen of the manikin and the enclosure 15. If no manikin is used, the strap 31 may extend around the enclosure 15. The TOCO transducer 28 may be mounted on the enclosure 15 such that the pressure-sensing probe (not shown in FIG. 1) extends into the enclosure 15 to contact the bladder 20.

The enclosure 15 may be formed of any suitable material, such as plastic or another semi-rigid or rigid material. The enclosure 15 may also be any suitable shape to generally contain the bladder 20 when it is fully inflated. For example, the enclosure may be an open frame or other structure capable of holding the bladder and allowing a TOCO probe to be positioned next to the bladder. The enclosure 15 may include an opening 18, such as an opening in the top of the enclosure. In some configurations, the enclosure 15 may have a generally open top that forms the opening 18. The opening 18 may allow the pressure-sensing probe 35 of the TOCO transducer 28 to contact the bladder 20 in the enclosure 15. The enclosure 15 may also include an opening 16 on a lateral side 15a of the enclosure 15. The opening 16 may be used to pass the length of tubing 24 from the enclosure 15 to the source of compressed gas 39. It will be appreciated that while the pressure release valve 47, pressure sensor 50, etc. are shown outside the enclosure 15 in FIG. 1, in some configurations these structures could be housed within the enclosure 15, attached to the outside of the enclosure, etc.

The bladder 20 may be selectively filled with air or gas via a source of compressed gas 39 at the second end 24b of the length of tubing 24. The bladder 20 may be pressurized at different levels to simulate uterine contractions. For example, pressures needed to simulate uterine contractions may range from about 1 mm Hg to about 40 mm Hg. As the bladder 20 is pressurized at different levels, the force exerted by the bladder 20 on the probe 35 changes. The pressure sensed by the probe 35 is sent to a standard fetal monitor via a cable 30 connection from the TOCO transducer a fetal monitor, which outputs a plot of the relative uterine activity level readings over time.

The length of tubing 24 connects to the bladder on a first end 24a and to a source of air or gas 39 on a second end 24b. Other means may be used to fluidly connect the bladder 20 to a source of gas 39, such as a manifold, a sealed box with ports to connect various pneumatic components, a pipe, etc. The source of air or gas 39 may be, for example, a tank of compressed gas or an air compressor. Alternatively, water pressure may be used. The flow of air or gas from the source 39 is controlled by one or more valves 44. The valve 44 may allow air or gas to pass into the bladder 20 from the air or gas source 39. The air or gas also passes a pressure release valve 47 located along the length of tubing. The pressure release valve 47 allows gas or air to leave the bladder 20 in proportion to the amount of pressure in the bladder 20. The pressure release valve 47 may be a pre-determined size, or the pressure release valve 47 may be adjustable. For example, the pressure release valve 47 may comprise a valve that is selectively opened and closed to allow air or gas to escape the bladder 20. The pressure release valve 47 may also be a hole of a pre-determined size to allow air or gas to escape the bladder. The pressure release valve may also be configured to have a pre-determined threshold pressure, or variable threshold pressure, over which it then releases pressure.

Opening the valve 44 causes the flow of gas or air to increase through the length of tubing 24 and into bladder 20, with an expected increase in bladder pressure. Closing the valve 44 to a flow less than the flow of the pressure release valve 47 allows the pressure in the bladder to fall.

The valve 44 may be any suitable type of valve that allows control of air or gas flow. For example, a variable flow valve may be used, a digital flow valve such as an electronically controlled proportional valve, fill and dump valves, a solenoid valve, etc. In some configurations, the valve 44 may be in communication with a processor 48 (indicated by dashed lines in FIG. 1) and controlled by software. The communication may be direct, or via a wireless protocol. A pressure sensor 50 may be placed along the length of tubing 24 and may also be in communication with the processor 48. The pressure sensor 50 may be used to measure the amount of pressure in the length of tubing 24 at a point upstream, or before, the pressure release valve 47, and may be used to determine the bladder pressure. In some configurations, the pressure sensor may be in communication with the processor of the valve 44 to allow the valve to open and close to achieve specific pressures at the pressure sensor 50.

The processor 48 may control the opening of valve 44 to achieve a desired pressure reading on the pressure sensor 50 for a certain pre-determined amount of time. For example, a software designed to mimic uterine contractions may open valve 44 to achieve a higher pressure reading for 30-60 seconds, the length of a typical true contraction. The software could also mimic false labor contractions to train clinicians in recognizing the difference between true labor contractions and false contractions. For example, contractions that did not progress, or strengthen relative to previous contractions, over time, may indicate false labor. While the absolute value of the uterine activity may be the same in two different women, it could indicate true labor in one woman (where the uterine activity level is increasing over time) and false labor in another (where the uterine activity level is not increasing over time). Another indication of false labor may be irregularity of contractions over time.

Figure 2:
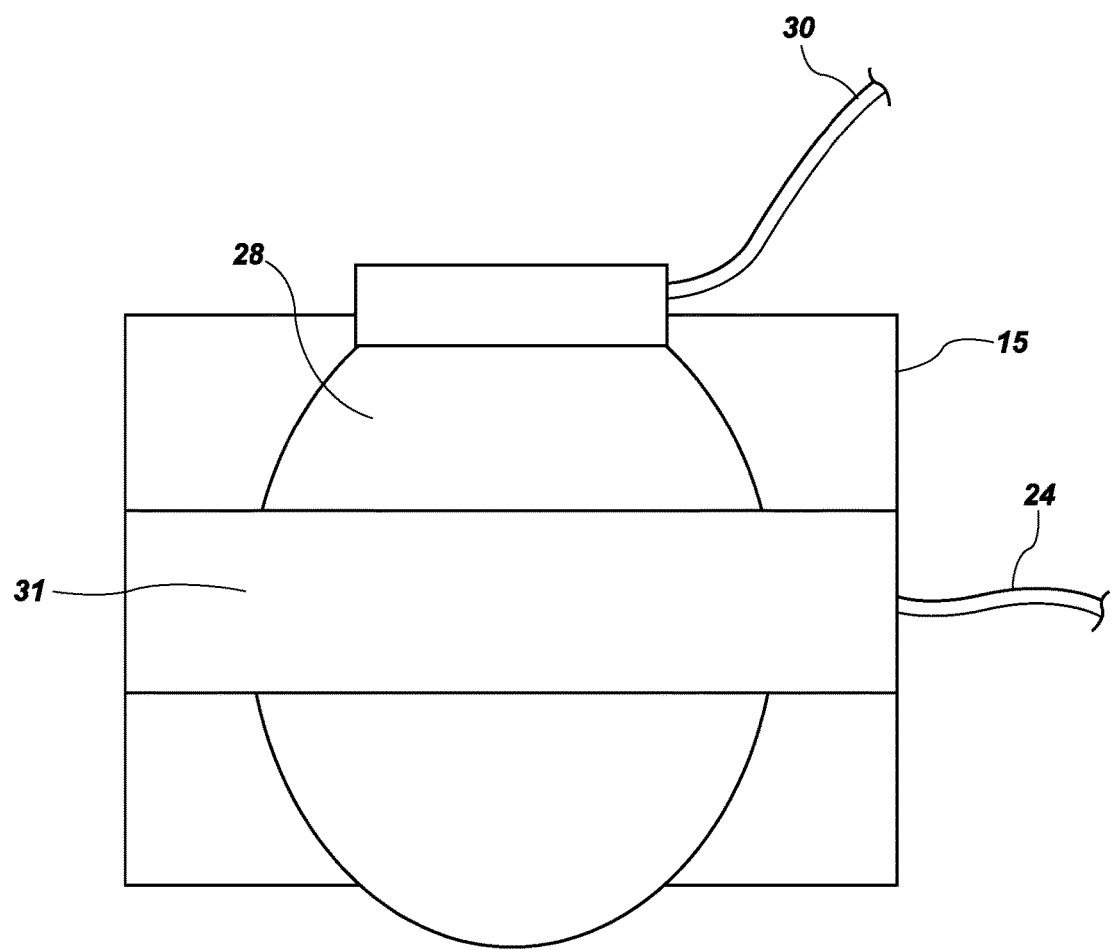
FIG. 2 is a top view of the device of FIG. 1, without the pneumatics shown.
Figure 3:
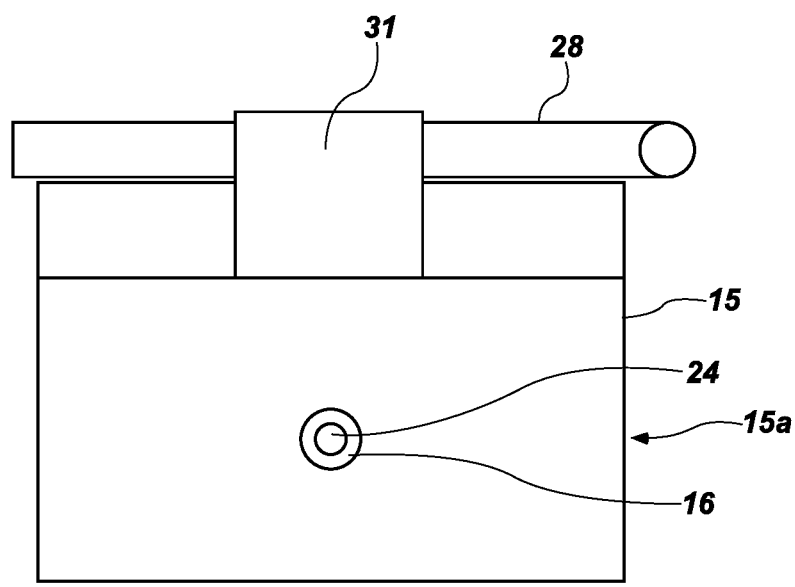
FIG. 3 is a side view of FIG. 2.

FIG. 2 shows a top view of the enclosure 15 and associated TOCO transducer 28 of FIG. 1. The pneumatics are not shown for clarity. FIG. 3 shows a lateral side view of the enclosure 15 and associated TOCO transducer 28 of FIG. 1. Again, the pneumatics are not shown for clarity. From this view, the opening 16 in the lateral side 15a of the enclosure 15 can be seen, with the length of tubing 24 exiting the housing from the lateral side 15a. It will be appreciated that the length of tubing 24 may be integral to the bladder 20, or it may be removably attachable to the bladder 20. Similarly, the pneumatics may be integral to the length of tubing 24 or may be removably attached to the length of tubing 24.

In some situations, it may be desirable to calibrate the system to account for variations such as placement of the TOCO transducer 28, tightness of the strap 31, etc. Calibration may be achieved by using a single data pair or multiple data pairs to determine the relationship between pressure measured by the pressure sensor 50 and the associated number for simulated uterine activity at that pressure. The uterine activity is a single digit number with no units, between 0 and 100. External TOCO transducers calculate only a relative measure of contraction strength, calibrated in percentage over the range 0-100 percent. This relative measurement is sufficient for normal fetal monitoring, giving an indication of how contractions strength increases as labor progresses, and showing the frequency of the contractions. The uterine activity level is calculated from the pressure measured at the probe 35 by a standard TOCO transducer known in the art, then displayed digitally to the clinician (such as on a computer screen) and plotted on a chart. It is standard for the x-axis to be time, and for the y-axis to be the uterine activity level (plotted from 0 to 100). Thus, contractions usually take the shape of a bell curve on an EFM plot.

The uterine activity level is usually at 15 when there is no contraction and the monitor can be zeroed while there is no known contraction occurring. Many clinicians may never zero or calibrate the TOCO transducer, but rather just place it on the patient and forget it. Since the critical information is the timing (start, peak, and end) of the contractions and relative magnitude (getting smaller, larger or the same) of the contractions, the exact size is not critical. The main goal of calibrating the intrauterine contraction simulation device of the present disclosure is for clinicians to be able to tell at what bladder pressures a specific uterine activity level is achieved.

The software and/or processor that controls the flow valve 44 may be used to collect the data needed for calibration. The calibration portion of the software asks the user to adjust the pressure level measured by the pressure sensor 50 by adjusting the flow valve 44 until the EFM plot reports a specific uterine activity level (i.e., 20). After this is done, the pressure reading at the pressure sensor 50 is recorded, along with its associated uterine activity level data on the EFM plot. The user is then asked to adjust the pressure at the flow valve 44 until a second uterine activity level is observed (i.e., 40), and the pressure reading at the pressure sensor 50 is recorded with its associated uterine activity level. This may be repeated as many times as desired to obtain calibration points. For example, ten calibration points may be needed to build an accurate calibration relationship. With these multiple calibration points the system builds the relationship between pressure at the pressure sensor 50 and uterine activity reading. The calibration relationship could be done with a curve fit equation (linear, polynomial, etc.) or with a look up table, etc. It will be appreciated that calibration may or may not be completed, and that the simulation device can work appropriately without the clinician performing the calibration steps.

Figure 4:
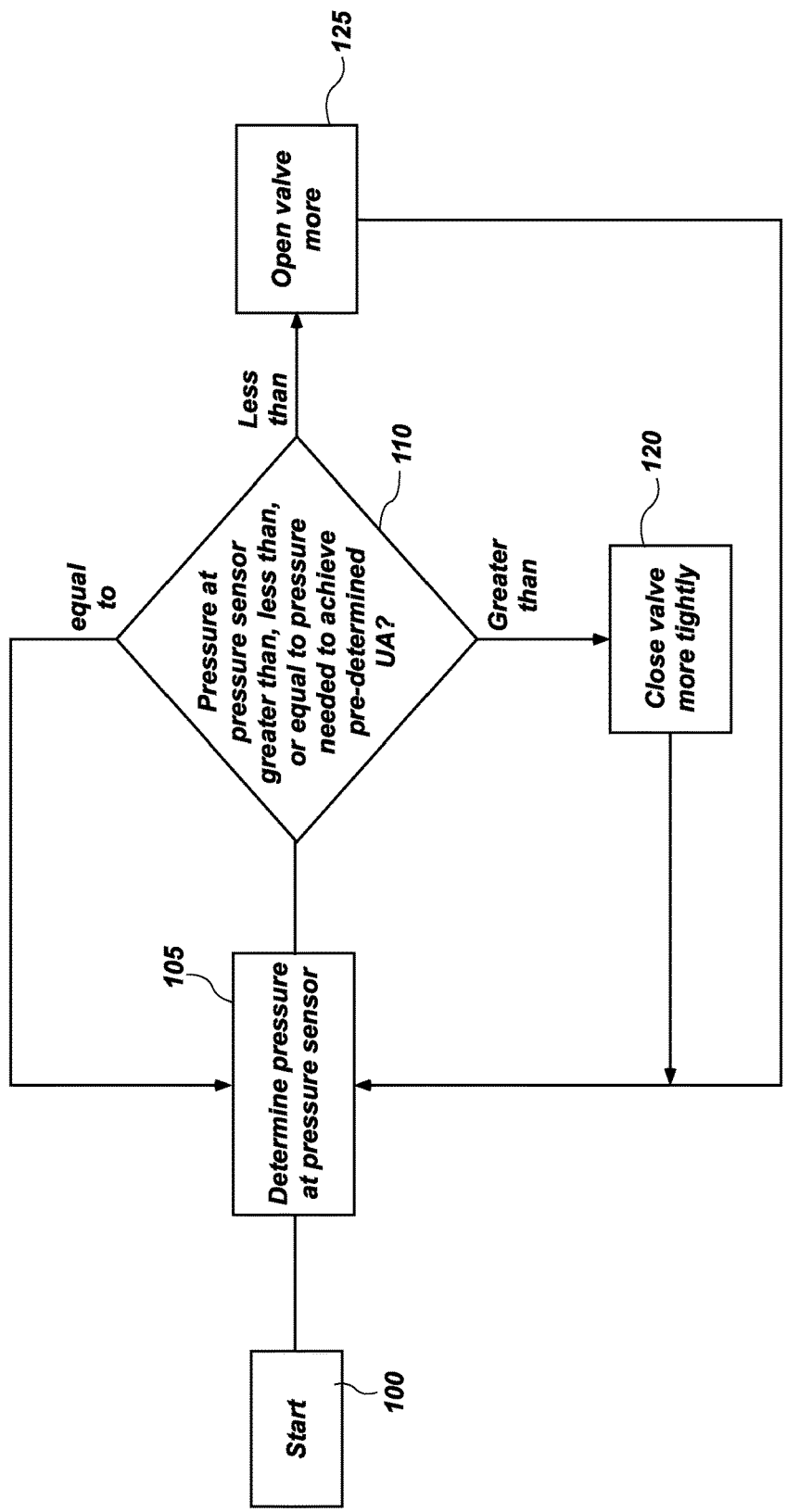
FIG. 4 is a flow chart illustrating a logic that may be used to achieve pre-programmed uterine activity levels to train clinicians.

After calibration is complete, the software that controls the flow valve 44 can achieve specific uterine activity levels (such as specific pre-programmed levels that simulate real contractions) by adjusting the flow to reach a specific pressure at the pressure sensor 50. For example, the software may follow the logic shown in FIG. 4. After a starting protocol 100, the software may query the pressure sensor to determine the pressure at the pressure sensor (105). Then, the software may compare that pressure to the known calibration curve to determine if the pressure reading at the pressure sensor is greater than, less than, or equal to the pressure needed to achieve the pre-determined uterine activity (UA) desired (110). If the pressure is the correct pressure to achieve the pre-determined UA desired, the logic may do the loop again, continuously querying the pressure sensor to determine the pressure (105), and comparing the pressure to the pressure needed to achieve the pre-determined UA desired (110).

If the pressure is not correct pressure to achieve the pre-determined UA desired, the logic may determine if the pressure is greater than or less than the correct pressure to achieve the pre-determined UA desired (110). If greater than the correct pressure, the valve 44 may be adjusted such that it is closed more tightly (120), thus delivering less compressed gas and lowering the pressure of the bladder 20. If less than the correct pressure needed to achieve the pre-determined UA, the valve 44 may be adjusted such that it is more open (125), delivering more compressed gas and increasing the pressure of the bladder 20. This loop may continue until the desired pressure is achieved. The software may be pre-programmed with pre-determined UA levels that simulate different types of contractions, including true contractions and false labor contractions, to assist in training clinicians.

According to another possible configuration, the system could be pressurized at various levels using a pressure release valve that releases pressure at variable pressure thresholds. In such a configuration, the bladder 20 may be filled at a constant rate, while the variable pressure release valve empties at a variable rate to achieve a pre-determined pressure. A flow valve would not be necessary in such a configuration.

The various aspects of a device as described herein may be sold as formed, single unit, or a kit may be provided that includes pieces of the device that may be connected later by a clinician. For example, a kit may contain a frame or enclosure, a bladder configured to fit in the frame or enclosure, a means for fluidly connecting the bladder to a source of gas (such as a piece of tubing or manifold), a pressure release valve, and a pressure valve configured to be fluidly connected to the bladder and source of gas.

While the invention has been described in particular with reference to certain illustrated configurations, such is not intended to limit the scope of the invention. The present invention may be embodied in other specific forms without departing from its spirit or essential characteristics. The described configurations are to be considered as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A device for simulating intrauterine contractions, the device comprising:
   an enclosure having an opening therethrough configured to receive a force sensor of a tocodynamometer;
   a bladder configured to fit within the enclosure, the bladder attached to a length of tubing, the length of tubing attached to a pressure sensor and the length of tubing configured to be attached to a source of compressed gas;
   the bladder in fluid communication with a pressure release valve and a digital flow valve;
   a processor in communication with the flow valve and the pressure sensor, wherein the processor is configured to receive a current pressure value from the pressure sensor, compare the current pressure value to a predetermined pressure value representative of a uterine activity, and the processor further programmed to adjust the flow valve in response to a difference between the current pressure value and the predetermined pressure value representative of a uterine activity.

2. The device of claim 1, wherein the flow valve is a variable flow valve.

3. The device of claim 1, further comprising software on the processor programmed to open and close the flow valve to achieve one or more pre-programmed pressures at the pressure sensor.

4. The device of claim 3, wherein the pre-programmed pressures are programmed to mimic one or more uterine activity levels of a pregnant patient over time.

5. The device of claim 4, further comprising software on the processor programmed to open and close the flow valve to achieve one or more pre-programmed pressures at the pressure sensor.

6. The device of claim 3, wherein the pre-programmed pressures are designed to mimic one or more uterine activity levels of a pregnant patient experiencing labor or false labor.

7. The device of claim 1, the enclosure having a hole in addition to the opening, the length of tubing passing through the hole, and the electronic flow valve external to the enclosure.

8. The device of claim 1, further comprising a tocodynamometer with a pressure-sensing portion, the pressure-sensing portion placed over the opening of the enclosure and in contact with the bladder.

9. The device of claim 1, wherein the predetermined pressure value representative of a uterine activity comprises a pressure value indicative of one or more of false labor and true labor.

10. A device for training clinicians in the use of tocodynamometers, the device comprising:
a frame, the frame having an opening on a top surface for receiving a force sensor of a tocodynamometer,
a bladder housed in the frame, the bladder in fluid communication with a pressure release valve, a pressure sensor, and a flow valve,
a processor, the processor programmed to receive a pressure sensor value from the pressure sensor, compare the pressure sensor value to a pre-programmed pressure value indicative of a uterine activity, and the processor further programmed to send a signal to the flow valve to adjust the flow valve when the pressure sensor value and the pre-programmed pressure value indicative of a uterine activity are not equal.

11. The device of claim 10, wherein the flow valve is one of a variable flow solenoid valve, a digital flow valve and a fill and dump valve.

12. The device of claim 10, further comprising a length of tubing having a first end and a second end, the bladder connected to the first end of the length of tubing, and the first end of the length of tubing passing through the frame; and
wherein the second end of the length of tubing has a connector that is configured to connect to a source of compressed gas.

13. A method for training clinicians in the use of tocodynamometers, the method comprising:
selecting a device designed to mimic uterine contractions, the device comprising:
an enclosure, the enclosure having an opening on a top surface and a second opening on a lateral side;
a bladder housed in the enclosure, the bladder connected to a first end of a length of tubing, the first end of the length of tubing passing through the second opening on the lateral side of the enclosure;
the length of tubing having a pressure release valve proximal to the first end, a pressure sensor, and a flow valve;
connecting the second end of the length of tubing to a source of compressed gas;
connecting a tocodynamometer to the enclosure with a strap, the tocodynamometer having a pressure-sensing probe, and placing the pressure-sensing probe through the opening on the top surface of the enclosure and in contact with the bladder.

14. The method of claim 13, wherein the device further comprises a processor in connection with the pressure sensor and flow valve, and wherein the method further comprises calibrating the device by adjusting the flow valve to achieve a pre-determined uterine activity level, and recording the pre-determined activity level and a pressure on the pressure sensor at the pre-determined uterine activity level.

15. A kit containing a device for simulating intrauterine contractions, the kit comprising:
an enclosure having an opening therethrough configured to receive a pressure sensor of a tocodynamometer;
a bladder configured to be housed in the enclosure;
a length of tubing, the length of tubing having a pressure release valve and a flow valve,
a connector configured to connect the length of tubing to a source of compressed gas,
a pressure sensor connected to the length of tubing, and
a processor programmed to receive a pressure sensor value from the pressure sensor, compare the pressure sensor value to a pre-programmed pressure value indicative of a uterine activity, and the processor further programmed to send a signal to the flow valve to adjust the flow valve when the pressure sensor value and the pre-programmed pressure value indicative of a uterine activity are not equal.

16. A system for simulating intrauterine contractions, the system comprising:
an enclosure having an opening therethrough configured to receive a force sensor of a tocodynamometer;
a bladder configured to fit within the enclosure;
the bladder in fluid communication with a pressure release valve,
wherein the bladder is configured to be connected to a constant source of pressure; and
a processor, the processor programmed to receive a pressure sensor value from the pressure sensor, compare the pressure sensor value to a pre-programmed pressure value indicative of a uterine activity, and the processor further programmed to send a signal to the flow valve to adjust the flow valve when the pressure sensor value and the pre-programmed pressure value indicative of a uterine activity are not equal.

17. The device of claim 16, wherein the pressure release valve is configured to release pressure at pre-determined pressure thresholds.

\* \* \* \* \*